United States Patent

[11] 3,587,918

| [72] | Inventor | Richard T. Cornelius<br>Minneapolis, Minn. |
|---|---|---|
| [21] | Appl. No. | 800,421 |
| [22] | Filed | Feb. 19, 1969 |
| [45] | Patented | June 28, 1971 |
| [73] | Assignee | The Cornelius Company<br>Anoka, Minn. |

[54] COMESTIBLE DISPENSING MACHINE
13 Claims, 2 Drawing Figs.

| [52] | U.S. Cl. | 221/96 |
|---|---|---|
| [51] | Int. Cl. | A47f 1/00,<br>A07f 11/00 |
| [50] | Field of Search | 221/96 |

[56] References Cited
UNITED STATES PATENTS

| 2,558,522 | 6/1951 | Knapp | 221/96 |
|---|---|---|---|
| 3,019,575 | 2/1962 | Charley et al. | 221/13 |

*Primary Examiner*—George T. Hall
*Attorney*—Hill, Sherman, Meroni, Gross & Simpson

ABSTRACT: A dispensing machine for comestibles such as beverages includes a cup vender, a vender for a utensil such as a straw, a plurality of dispensing valves for comestibles such as beverages, and a corresponding plurality of selector switches, all of which is under the control of a coin-actuated timer.

PATENTED JUN28 1971 3,587,918
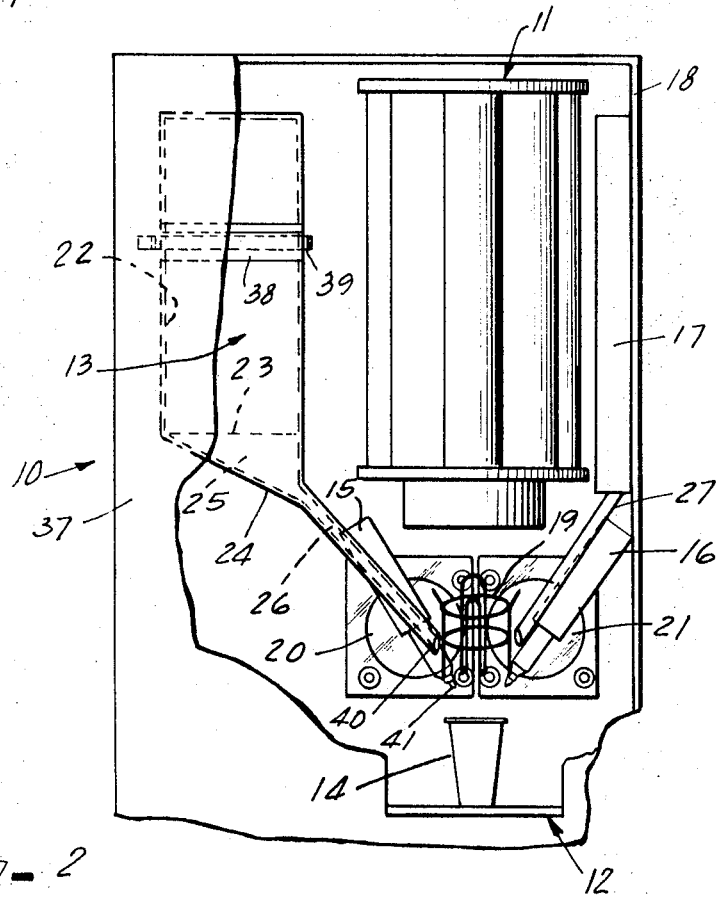
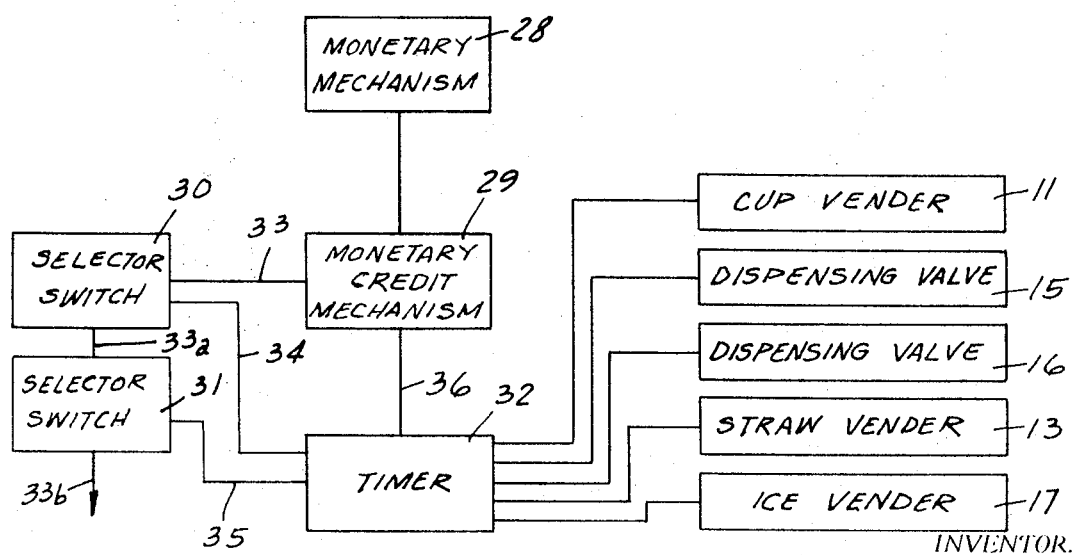
INVENTOR.
RICHARD T. CORNELIUS
BY Hill, Sherman, Meroni, Gross & Simpson ATTORNEYS

COMESTIBLE DISPENSING MACHINE

BACKGROUND OF THE INVENTION

This invention pertains to a comestible-dispensing machine, and more particularly to a dispensing machine of the type that first vends a cup and then dispenses the comestible into the same.

SUMMARY OF THE INVENTION

A vender is provided in a comestible dispensing machine for automatically vending a sipping straw into a cup that has been vended, into which cup the comestible is dispensed. If desired, an ice vender is also coordinated therewith. In the disclosed embodiment, the comestible is a beverage.

Accordingly, it is an object of the present invention to provide a comestible dispensing machine which will also vend a straw.

Another object of the present invention is to provide a straw dispenser in a comestible-dispensing machine in such a manner that the straw is vended directly into a previously vended cup at a comestible dispensing station.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING:

FIG. 1 is a fragmentary elevational view, to some degree diagrammatic, of a beverage dispensing machine provided in accordance with the present invention; and FIG. 2 is a circuit diagram for control of the beverage-vending machine of FIG. 1.

AS SHOWN ON THE DRAWING

The principles of the present invention are particularly useful when embodied in a comestible-dispensing machine such as a beverage-dispensing machine, generally indicated by the numeral 10. The dispensing machine 10 includes means in the form of a cup vender 11 for vending a cup to a dispensing station 12, means in the form of a straw vender 13 for vending a straw into the cup 14 at the dispensing station 12, and at least one comestible-dispensing means, here in the form of beverage-dispensing valves 15, 16 for dispensing beverage or other comestible into the cup 14 at the dispensing station 12. In certain embodiments, it is also preferable that the dispensing machine 10 include an ice dispenser or vender 17 which is arranged to deliver ice into the cup 14 at the dispensing station 12. To control the foregoing, a circuit is provided as described below.

The dispensing machine 10 includes a conventional cabinet 18, here having a front door 37, which door supports the straw vender 13, the dispensing station 12 being secured to the door 37. The straw vender 13 has a support flange 38 that fits over a horizontal support bar 39 secured to the door 37.

Within the cabinet 18 the cup vender 11 is disposed, which may be of conventional construction. Its outlet is directly above the dispensing station 12. When actuated, the cup vender 11 delivers a cup such as the cup 14 through its outlet or lower end, such cup being guided by a cup chute 19 to the exact proper predetermined spot at the dispensing station 12 and thus being further guided against tipping.

The dispensing valves 15, 16 are each connected to a source of beverage or other comestible 20, 21, the diagram here illustrating such source as being of the semifrozen type. The dispensing valves 15, 16 have internal electric solenoids by which they are selectively opened or closed.

The straw vender 13 includes an internal compartment 22 for storing drinking straws horizontally which are discharged by electrically controlled mechanism (not shown), one such horizontal straw being illustrated just at the moment of release by the dashed line 23. The discharge end of the straw vender 13 is connected to the upper end of a straw chute 24 and, as illustrated, the left end of the straw 23 strikes the chute first while the right end of the straw 23 is permitted to tilt downwardly and thus slide endwise downwardly and laterally in a funnellike portion 25 into a fully closed tubular portion 26, the lower end or outlet end of which is so directed that the straw will discharge laterally directly into the cup 14. The lower end 40 of the chute 24 is above and outside of the rim of the cup 12 and is above the outlet 41 of the dispensing valve 15.

In like manner, the lower end of the ice vender 17 is provided with a chute 27 that is also directed to the cup 14, as are the dispensing valves 15, 16.

Thus, the cup 14, completely empty is first vended after which the various other dispensing and vending components are energized in proper sequence and for proper duration to obtain the desired serving in the cup 14.

The circuit by which the beverage-dispensing machine 10, thus far described, is operated is shown in part in a diagrammatic fashion in FIG. 2.

A coin or other monetary mechanism 28 on being suitably actuated by a proper deposit actuates a monetary credit mechanism 29. When sufficient credit has been registered on the credit mechanism 29, actuation of either of one or two selector switches 30, 31 will effect the dispensing of the selected beverage or other comestible by one of the dispensing valves 15, 16. Such dispensing is further governed by a timer 32 which is connected to control the three venders 11, 13 and 17 and to control the dispensing valves 15, 16. In order to be certain that the vended straw will not bounce out of the cup by striking beverage, it is preferable, particularly for a rather viscous beverage, that the timer 32 should effect operation of the straw vender 13 such that the straw will be vended before the cup 14 has been more than one-half filled by one of the dispensing valves 15, 16.

In operation, the monetary mechanism 28 effects actuation of the credit mechanism 29 which delivers power through a line 33 to a common terminal in the selector switch 30. The selector switch 30 and the selector switch 31 can be both of the single-pole double-throw type. The line 33 is connected to the common terminal and the normally closed contact is connected by a line 33a to the common terminal of the succeeding selector switch 31. The normally closed contact of the selector switch 31 is connected by a line 33b to any further or succeeding selector switches. On actuation of the selector switch 30, the normally open contact becomes closed to complete a circuit from the line 33 to a line 34 leading to the timer 32. When the selector switch 31 is closed, its normally open contact becomes connected to the line 33, 33a to bring power to a line 35 leading to the timer 32. The lines 34, 35 are respectively associated with switches leading to the dispensing valves 15, 16. The lines 34, 35 are also connected within the timer 32 in a conventional manner to initiate operation of such timer 32 which has a number of control circuits. First of all, the cup vender 11 is energized so as to dispense the cup 14. Thereafter, in such sequence as may be desired, the straw vender 13 is actuated, the ice vender 17 is actuated, and one of the dispensing valves 15, 16 is actuated for a predetermined period of time to dispense the proper amount of serving. The timer 32 also sends a signal through a line 36 back to the monetary credit mechanism 29 to erase the credit that was utilized for making the selection on the selector switch 30 or 31.

Where only one type of comestible is to be dispensed, the selector switches 30, 31 and the credit mechanism 29 can be omitted, and in that instance, the reception of the coin or other monetary deposit, instead of energizing the credit mechanism 29, directly energizes the timer 32.

Where the comestible being dispensed is watery, the straw or other utensil vender 13 preferably is energized near the end of the comestible dispensing, for example just after the termination of such dispensing. And then the ice vender would be energized. Depending on the time constant of each of the venders and the dispensing valves, the timer can be compensated so as to achieve the desired net result.

For maximum precision operation, the straw chute 26 should direct the straw against the opposite wall of the cup 14 rather than against the bottom of the cup 14. Where a straw is directed to impact directly against the bottom of the cup, an occasional straw may rebound out of the cup.

Although various minor modifications might be suggested by those versed in the art, it should be understood that I wish to embody within the scope of the patent warranted hereon, all such embodiments as reasonably and properly come within the scope of my contribution to the art.

I claim:
1. A beverage-dispensing machine comprising:
a. means for vending a cup to a dispensing station;
b. means for vending a hollow sipping straw into said vended cup at said dispensing station; and
c. means for dispensing a beverage into said cup.

2. A beverage-dispensing machine according to claim 1 including means for dispensing ice into said vended cup.

3. A beverage-dispensing machine according to claim 1, said dispensing means being arranged to handle a premixed beverage that is partially frozen, and including a second means for dispensing a second such beverage into said cup, and a pair of selector switches connected to enable selection of the beverage to be dispensed.

4. A beverage-dispensing machine according to claim 1, including a timer controlling the operation of both of said vending means and said dispensing means, said timer having a setting to effect vending of said straw after some but before one-half of said beverage has been dispensed into said cup.

5. A beverage-dispensing machine according to claim 1, including a timer controlling the operation of both of said vending means and said dispensing means, said timer having a setting to effect vending of said straw near the end of the dispensing of the beverage into the cup.

6. A beverage-dispensing machine according to claim 5, including means for dispensing ice into said vended cup, said ice dispensing means being under the control of said timer to effect ice dispensing after the vending of said straw.

7. A beverage-dispensing machine according to claim 1, including:
a. a door mounted on the machine;
b. a cup support carried by said door at the dispensing station; and
c. said straw-vending means being supported by said door.

8. A beverage-dispensing machine according to claim 1, in which said straw vending means includes a chute receptive of a vended straw and directed toward said vending station, said straw chute fully enclosing the path in which the straw moves, down to its outlet.

9. A beverage-dispensing machine according to claim 8 in which the outlet of said straw chute is above the outlet of said dispensing means.

10. A beverage-dispensing machine according to claim 1, the outlet of said cup-vending means being disposed substantially directly above the dispensing station, said straw-vending means being disposed laterally thereof, and including a chute directed laterally toward the cup.

11. A beverage-dispensing machine according to claim 1, including:
a. a coin mechanism;
b. a monetary credit mechanism responsive to said coin mechanism; and
c. means including manual selector switch means responsive to said credit mechanism and a timer responsive to said selector switch means for controlling both of said vending means and said dispensing means.

12. A method of dispensing a beverage, comprising:
a. providing a quantity of cups;
b. providing a separate quantity of hollow sipping straws;
c. vending a cup to a dispensing station;
d. vending a straw into the cup at the dispensing station; and
e. dispensing the beverage into the cup.

13. A method of dispensing according to claim 12, wherein the vending of the straw takes place after the dispensing of the beverage begins but before the dispensing of the beverage has terminated.